United States Patent [19]

Jacaruso et al.

[11] Patent Number: 5,389,184
[45] Date of Patent: Feb. 14, 1995

[54] HEATING MEANS FOR THERMOPLASTIC BONDING

[75] Inventors: Gary J. Jacaruso, Milford; Geoffrey C. Davis, Madison; Allen J. McIntire, Ansonia, all of Conn.

[73] Assignee: United Technologies Corporation, Hartford, Conn.

[21] Appl. No.: 168,910

[22] Filed: Dec. 16, 1993

Related U.S. Application Data

[63] Continuation of Ser. No. 860,480, Mar. 30, 1992, abandoned, which is a continuation-in-part of Ser. No. 628,245, Dec. 17, 1990.

[51] Int. Cl.⁶ .................... B32B 31/00; H05B 3/34
[52] U.S. Cl. ........................ 156/378; 156/379.7; 156/273.9; 219/544; 219/549; 428/138
[58] Field of Search ............... 156/273.9, 378, 379.7; 219/531, 544, 549; 428/137, 138, 98

[56] References Cited

U.S. PATENT DOCUMENTS

| | | | |
|---|---|---|---|
| 1,339,736 | 5/1920 | Burke | 156/273.9 X |
| 2,243,506 | 5/1941 | Mitchell | 156/273.9 X |
| 2,372,929 | 4/1945 | Blessing | 154/43 |
| 2,423,922 | 7/1947 | Arndt, Jr. | 156/273.9 X |
| 2,647,072 | 7/1953 | Smith | 156/273.9 X |
| 2,662,045 | 12/1953 | Baggott | 156/273.9 X |
| 2,715,598 | 8/1955 | Rees et al. | 156/273.9 X |
| 2,952,578 | 9/1960 | Carlson, Jr. | 154/126 |
| 3,239,403 | 3/1966 | Williams et al. | 156/273.9 |
| 3,864,186 | 2/1975 | Balla | 156/272 |
| 3,868,291 | 2/1975 | Benz et al. | 156/515 |
| 3,900,360 | 8/1975 | Leatherman | 156/276 X |
| 3,985,604 | 10/1976 | Balla | 156/244 |
| 3,993,529 | 11/1976 | Farkas | 156/380 |
| 3,996,402 | 12/1976 | Sindt | 428/140 |
| 4,045,272 | 8/1977 | Lombardi | 156/380 |
| 4,110,506 | 8/1978 | Cottinham et al. | 428/138 |
| 4,242,573 | 12/1980 | Batliwalla | 219/544 |
| 4,268,338 | 5/1981 | Peterson | 156/251 |
| 4,313,777 | 2/1982 | Buckley et al. | 156/272 |
| 4,416,713 | 11/1983 | Brooks | 156/273.9 |
| 4,533,589 | 8/1985 | Sewell | 156/307.3 X |
| 4,556,439 | 12/1985 | Bannick et al. | 156/344 X |
| 4,560,428 | 12/1985 | Sherrick et al. | 156/273.9 |
| 4,656,339 | 4/1987 | Grise | 219/549 |
| 4,704,509 | 11/1987 | Hilmersson et al. | 219/10.53 |
| 4,705,937 | 11/1987 | Marek | 156/273.9 X |
| 4,908,088 | 3/1990 | Boyd et al. | 156/307.3 |
| 4,957,805 | 9/1990 | Biggs et al. | 156/308.2 X |
| 4,963,215 | 10/1990 | Ayers | 156/308.2 X |
| 5,068,518 | 11/1991 | Yasuda | 219/549 |
| 5,152,863 | 10/1992 | Manos | 156/331.5 |

FOREIGN PATENT DOCUMENTS

| | | |
|---|---|---|
| 179451 | 10/1985 | European Pat. Off. |
| 2620648 | 9/1987 | France |
| 1034738 | 7/1966 | United Kingdom |

*Primary Examiner*—Chester T. Barry
*Attorney, Agent, or Firm*—Terrance J. Radke

[57] ABSTRACT

A heating element for providing localized heating during the thermoplastic bonding of thermoset composite structures is disclosed. Various construction details are developed which disclose an apparatus and method for uniformly heating a bond line. In one embodiment, a heating element (22) includes a resistance heating material (24) sandwiched between two layers of electrical insulation (25) and encased within a layer of thermoplastic material (26). Low resistance electrical leads (28), which extend across the width of the resistance heating material, and a power supply (30) provide electrical energy to raise the temperature of the resistance heating material.

11 Claims, 2 Drawing Sheets

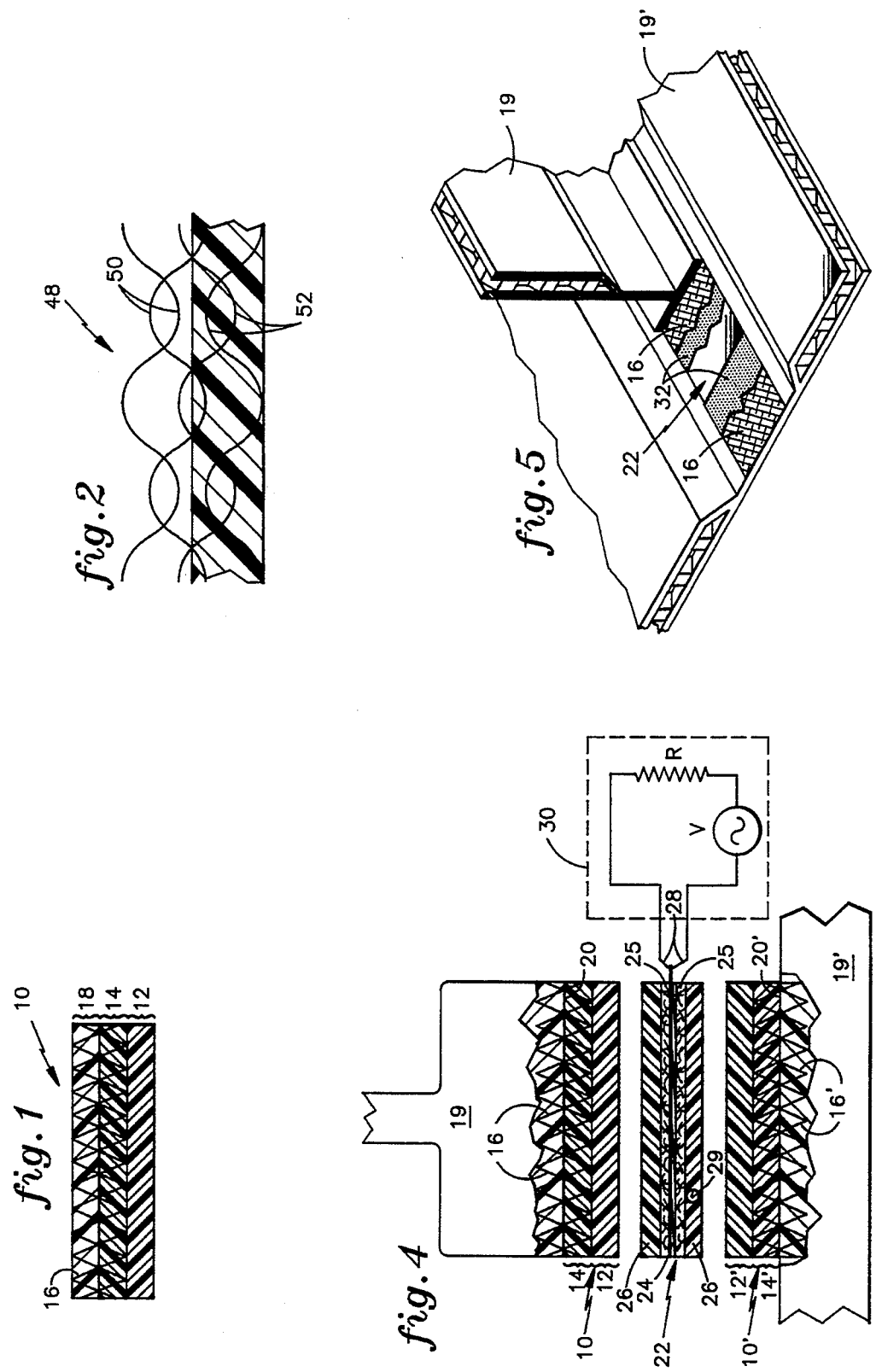

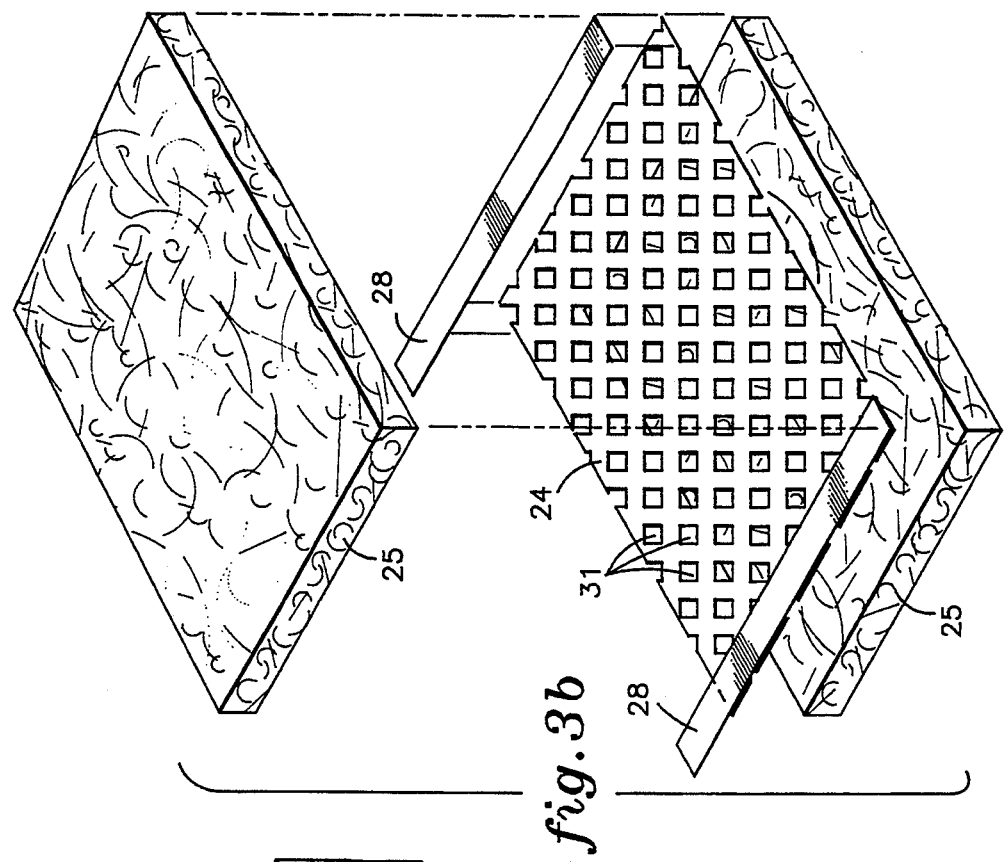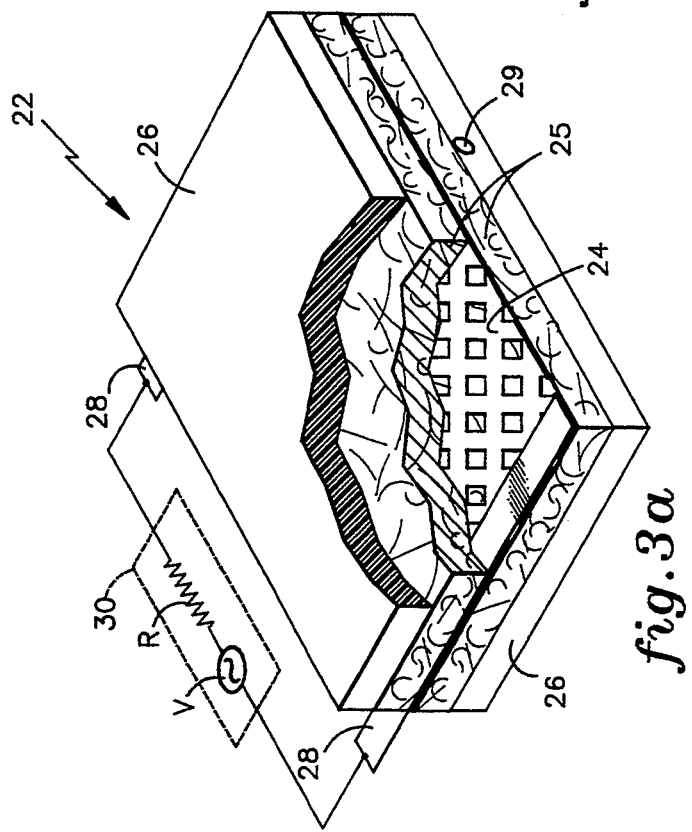

HEATING MEANS FOR THERMOPLASTIC BONDING

This application is a continuation of Ser. No. 07/860,480, filed Mar. 30, 1992, now abandoned, which is a continuation-in-part of application Ser. No. 07/628,245, filed Dec. 17, 1990, now abandoned, entitled "Bonding of Thermoset Composite Structures".

TECHNICAL FIELD

This invention relates to heating means used in structural bonding, and more particularly to heating means used in thermoplastic bonding of thermoset composite structures.

BACKGROUND ART

Thermoset composites have received widespread use in the aircraft industry as a structural material. This type of composite can provide a light weight structure of relatively high strength. To obtain a high strength structural bond with thermoset composites currently requires costly methods of bonding combined with mechanical fasteners.

One method of bonding thermoset composite structures together is to place thermoset resin film adhesive material between the surfaces to be bonded, followed by applying heat and pressure to the joint zone. This process is not very practical as it involves the application of relatively high heat (250°–350° F.) and pressure (25 psi. minimum) for extended periods of time (2 hours minimum at temperature). Thermal expansion can become a problem when large areas of structure are heated as required for this process. This is due to differing rates of thermal expansion of localized structure which causes thermal strain when the structure is cooled and can cause deformations. Another drawback is that thermoset adhesives can only be processed once and the bond is not reversible for repair or replacement of subsequently damaged sub-structure.

A second method currently used involves attaching together thermoset composite structure using mechanical fasteners combined with room temperature curing thermoset paste adhesive applied to joint surfaces. This method requires that the components being joined be pre-fitted and drilled for pilot holes, disassembled, cleaned and bond prepared. Adhesive is then applied to joint surfaces, the components are then reassembled, and the adhesive cured (usually 24 hours at room temperature). The next step is to drill and ream holes for each fastener and finally the fasteners are installed. This method is costly due to the use of mechanical fasteners and the labor intensive nature of the method.

An alternative to these processes is to use a film of thermoplastic adhesive between the thermoset composite structures being joined together. Since thermoplastic may be repeatedly melted and refused, the bonding process can be reversed as needed. Unfortunately, current thermoset resins will not chemically adhere with sufficient strength to suitable thermoplastic adhesive materials to meet aircraft requirements for joining structural components. Therefore this method is not practical in situations requiring high strength bonds.

Heating means for the bonding process are typically apparatus for induction heating or electrical resistance heating. Induction heating is adequate but difficult to apply for repairs or replacements performed in the field. Electrical resistance heaters, typically embedded in the bond, are more easily re-used for repair and replacement functions. The heating elements used as resistance heaters in the prior art have limitations, however, one limitation is the occurrence of hot spots and cold spots during the bonding process. The hot spots and cold spots are due to uneven heating provided by the heating element. The result is a degradation in the quality of the bond.

DISCLOSURE OF THE INVENTION

An object of the invention is an improved method of joining together thermoset composite structures.

Another object of the invention is means to uniformly heat a bonding surface between two structures being bonded.

Thermoset composite structures are bonded together using thermoplastic adhesive strips which are comprised of a layer of suitable thermoplastic material and a ply of dry fiber reinforcement which is partially embedded in the layer of thermoplastic material, wherein the exposed dry fiber reinforcement is coated with a thermoset resin. The surfaces of uncured thermoset composite structures are prepared by positioning adhesive strips with the thermoset resin side towards the composite structures. The composite structures are then cured by conventional means. Subsequent to curing, the bonding surfaces (now coated with the thermoplastic adhesive strip) are pressed together and heated to fuse the joint. During this process sufficient heat is applied locally to melt and fuse the thermoplastic adhesive material without degrading the adjacent composite structure. The joint is allowed to cool using the composite structure as a heat sink.

The layer of dry fiber reinforcement, which bonds to both the thermoplastic adhesive material and the thermoset material (during the cure cycle), provides the means to mechanically lock the thermoset composite structure to the thermoplastic adhesive. This eliminates the need for a chemical bond to join the two components. The use of a thermoplastic material as an adhesive allows the bonding process to be easily and quickly reversed for repair or replacement of the thermoset structure.

According to the present invention, the heat applying means is a heating element comprised of a resistance heating material embedded within two layers of thermoplastic adhesive material. The bonding surfaces are heated by placing the heating element between the bonding surfaces of the cured structures, applying pressure to the joint, and passing electrical energy, sufficient to heat the joint to above the melting temperature of the thermoplastic material, through the resistance heating material for a duration sufficient to fuse the layers of thermoplastic adhesive material. The heating element remains within the joint after bonding and provides a convenient mechanism to reheat the joint and reverse the bonding process.

According to a specific embodiment, the heating element includes a resistance heating material, means to prevent short circuits between the resistance heating element and the structures to be bonded, and a pair of low resistance electrical leads. The means to prevent short circuits includes two layers of electrically insulating material extending about opposite sides of the resistance heating material such that the resistance heating material is interposed therebetween. The electrical leads extend across the width of the resistance heater, are spaced lengthwise along the heating element, and are connected to a power supply.

According further to the present invention, a method to heat adjacent bond surfaces includes the steps of placing the heating element between the bond surfaces and passing electrical energy between the electrical leads.

According to a further embodiment of the present invention, a heating element includes a plurality of electrical leads spaced along the length of the heating element, wherein each adjacent pair of leads defines a segment of the heating element. The plurality of electrical leads permits a method of heating the segments sequentially such that the bond surfaces may be bonded one segment at a time.

A principle feature of the present invention is the means to prevent short circuits during the bonding of conductive materials. Another feature is the low resistance electrical leads which extend across the width of the resistance heating material.

A primary advantage of the present invention is the uniform heating of the bond line which results in part from the means to prevent short circuits and the electrical leads. The means to prevent short circuits ensures that electrical energy passes through the resistance heating material and not through adjacent structure. The means to prevent short circuits avoids the occurrence of cold spots due to electrical discontinuity caused by short circuits. The means to prevent short circuits also contributes to uniform heat distribution within the heating element as a result of thermal insulating properties of the means. The electrical leads, disposed along the length of the heating element, uniformly pass electrical energy through the heating element. By extending across the width of the resistance heating material, the electrical leads bound the resistance heating material therebetween to ensure that all portions of the resistance heating material are within the path of the electrical energy flowing between the electrical leads.

Although the invention described is particularly useful as means of heating during the bonding process for thermoset composite structures on aircraft, it should be understood that the invention is equally well suited to any other application in which composite components are joined together in a heat activated process.

The foregoing and other objects, features and advantages of the present invention will become more apparent in light of the following detailed description of the exemplary embodiments thereof, as illustrated in the accompanying drawings.

BRIEF DESCRIPTION OF THE DRAWINGS

FIG. 1 is a sectional view of a thermoplastic adhesive strip.

FIG. 2 is a sectional view of a woven thermoplastic adhesive strip.

FIG. 3a is a perspective view of a heating element, partially cut away to show a resistance heating material and electrical insulation.

FIG. 3b is perspective view of a resistance heating material and two layers of electrical insulation.

FIG. 4 is a sectional view of a pair of bonding surfaces prepared for bonding.

FIG. 5 is a perspective view of a pair of thermoset composite structures after bonding, partially cut away to show the bonding layers.

BEST MODE FOR CARRYING OUT THE INVENTION

Referring now to FIG. 1, a thermoplastic adhesive strip 10 is comprised of a layer of semi-crystalline thermoplastic material 12, a layer of amorphous thermoplastic material 14, a layer of dry fiber reinforcement 16, and a layer of thermoset resin 18. The size of the strip 10 is dependant on the size of the structures to be bonded together. For illustrative purposes the thickness of the layer of semi-crystalline thermoplastic material is 0.004"; the thickness of the amorphous thermoplastic material is 0.003"; the thickness of the dry fiber reinforcement is 0.006"; and the thickness of the layer of thermoset resin is sufficient to coat the exposed layer of dry fiber reinforcement.

The fabrication of the adhesive strip involves several steps. First, the layers of semi-crystalline thermoplastic material 12 and the amorphous thermoplastic material 14 are initially fused together by raising the temperature of the two layers 12,14 above the melting point of the semi-crystalline thermoplastic material and pressing the layers of 12,14 together under approximately 5 to 20 psi. Since semi-crystalline thermoplastic material has a higher melting temperature than amorphous thermoplastic material, the two layers 12,14 become intimately fused.

A typical semi-crystalline thermoplastic material is polyetheretherketone (PEEK), which has a melting temperature of approximately 650° F., and a typical amorphous thermoplastic material is polyetherimide (PEI), which has a melting temperature of approximately 480° F. PEEK and PEI will be utilized in this description for illustrative purposes.

Second, the layer of dry fiber reinforcement 16 is embedded into the layer of PEI 14 by laying up the dry fiber reinforcement 16 onto the layer of PEI 14, applying pressure of approximately 5 to 15 psi, and heating the strip to a temperature above the melting temperature of PEI, but less than the melting temperature of PEEK. Since a temperature less than the melting temperature of PEEK is used, the layer of PEEK 12 acts as a barrier and prevents the layer of dry fiber reinforcement 16 from inserting beyond the PEI layer 14. In this way a portion of the dry fiber reinforcement 16, which is thicker than the layer of PEI 14, is bonded with the layer of PEI 14, and the remainder is exposed (i.e. not embedded). The last step is to coat ('wet-out') the exposed dry fiber reinforcement 16 with a thermoset resin 18.

An alternative method for fabricating a thermoplastic adhesive strip is shown in FIG. 2. A woven thermoplastic adhesive strip 48 is comprised of dry fiber reinforcement strands 50 woven together with commingled strands 52, which are formed by intimately fusing dry fiber reinforcement strands and spun thermoplastic filaments. The weaving produces a material which is predominantly dry fiber reinforcement on one side and commingled strands on the other side. The woven material is pressed onto a layer 54 of thermoplastic material, which is thinner than the woven material, with the side which is predominantly commingled strands adjacent to the layer of thermoplastic material, and sufficient heat is supplied to melt the layer of thermoplastic material. After cooling, the dry fiber reinforcement strands are fused with and partially embedded in the layer of thermoplastic material. The exposed dry fiber strands are then coated with thermoset resin.

Another alternative (not shown) is to weave dry fiber reinforcement strands with thermoplastic filaments so as to produce a woven material with predominantly dry fiber reinforcement strands on one side and a combination of dry fiber reinforcement strands and thermoplastic filaments on the other side. As before, the woven material is pressed onto a layer of thermoplastic material which is thinner than the woven material, with the woven material which is a combination of dry fiber and thermoplastic filaments adjacent to the layer of thermoplastic material, and sufficient heat is supplied to melt the thermoplastic material. After cooling, the dry fiber reinforcement strands are fused with and partially embedded in the layer of thermoplastic material. The exposed dry fiber strands are then coated with thermoset resin.

An adhesive strip 10 is placed on an uncured thermoset composite structure 19. The adhesive strip is placed so that the layer of thermoset resin coated, dry fiber reinforcement 16 is adjacent to the composite structure 19. The structure 19, with adhesive strip 10 in place, is cured as normally required for the thermoset composite to produce a bonding surface 20. During cure the thermoset resin 18 will wet-out (impregnate) the exposed dry fiber reinforcement 16, which then becomes anchored to the thermoset structure 19. In this way the dry fiber reinforcement 16 forms a mechanical lock between the thermoset structure 19 and the thermoplastic adhesive strip 10, as shown in FIG. 4.

Heating means is required to melt the thermoplastic of the adhesive strips 10 of the two prepared bonding surfaces. FIG. 3a and 3b illustrate a heating element 22 which provides means to heat the bonding surfaces. The heating element 22 is comprised of a resistance heating material 24 sandwiched between two layers of electrical insulation 25. The resistance heating material 24 and the layers of electrical insulation 25 are encased within a layer of thermoplastic adhesive 26 which is compatible with the thermoplastic material of the bonding surfaces. The resistance heating material 24 includes a pair of electrical leads 28 which extend across the full width of the resistance heating material 24 and are connected to an electrical power supply 30. In addition, the heating element 22 may include one or more thermocouples 29 to monitor the temperature during the bonding process.

The heating element 22 is fabricated in the following manner. A sheet of thin metallic foil is precision slit and expanded to create a grid-like structure having a plurality of open areas 31. This structure is commonly referred to as pierced and stretched foil and is commercially available in various sizes. The pair of electrical leads are then attached to each end of the expanded foil. The metallic foil and electric leads are then sandwiched between two layers of electrical insulation. The sandwiched metal foil and electrical insulation is then laminated with a film of thermoplastic material. The film of thermoplastic material is thick enough to fill any voids or air pockets in the electrical insulation or the metallic foil.

The material chosen for the metallic foil and the thickness and dimensions of the heating element are dependent upon the heating requirements of the specific application. For the specific application disclosed in FIGS. 1-5, a stainless steel foil having a thickness of approximately 0.003" and expanded to have approximately 65% open area was successfully tested. Although a pierced and expanded foil is disclosed in FIGS. 3a and 3b as the resistance heating material, other forms of electrical heating element materials, such as etched foils, stamped elements, wound wire serpentine, and thin metallic sheets, may be used successfully.

The electrical insulation provides means to prevent short circuits during the heating process. Short circuits may occur if the dry fiber reinforcement material is electrically conductive or if the structures to be bonded are electrically conductive. Short circuits would cause cold spots to occur during the heating process and may cause damage to the thermoset composite structure. The layers of electrical insulation may also be used as a thermal barrier about the resistance heating material to provide resistance to the outward flow of heat from the heating element. The thermal resistance or insulation may improve the uniformity of the heat distribution by urging the heat generated by the heating element to spread evenly throughout the heating element.

A material which has been successfully tested for the electrical insulation is fiberglass scrim. Other materials may also be successfully used, such as plastic films or ceramic fibers. The material chosen for the layer of electrical insulation should be one which permits the thermoplastic material to pass through during the lamination of the heating element 22. In addition, the material chosen for the layers of electrical insulation should be one which can withstand the temperatures encountered during the bonding process.

Low resistance electrical leads are used to avoid overheating of the electrical leads during the heating process. The electrical leads extend across the entire width of the metallic foil in order to provide uniform heating across the width of the foil and between the electrical leads. Uniform heating is desirable to avoid thermal anomalies, such as hot spots and cold spots, during the bonding process.

Although shown in FIGS. 3a and 3b as having two electrical leads, the heating element may have a plurality of electrical leads attached to it along its length. This configuration (not shown) provides a mechanism for sequentially heating segments of the heating element, where the segments are defined by adjacent electrical leads. Sequential heating may be desirable if the bond length is extremely long. It should be noted, however, that the electrical leads, since they are low resistance, may cause cold spots to occur in the region adjacent to the electrical leads. If the heating element is to be powered sequentially, each segment of the heating element should be maintained above the melt temperature until the adjacent segment is heated to the melt temperature. This provides an overlap around the electrical leads of temperatures above the melt temperature and prevents a cold spot from occurring.

A pair of cured structures 19,19' are bonded together by placing the heating element 22 between the prepared bonding surfaces 20,20' with the bonded adhesive strips 10,10' as shown in FIG. 4 Pressure of approximately 10 to 30 psi is applied to the joint and electrical energy is passed through the heating element by means of an electrical power supply 30. The joint is heated above the melting temperature of PEEK. This temperature is maintained for a sufficient time to fuse the thermoplastic adhesive in the joint.

For the adhesive strips as described above it is believed that the temperature of the joint should be raised above the melting temperature of PEEK (650° F.) in approximately one minute and maintained at that temperature for approximately 15 seconds. The rate of temperature increase and duration of the heating process is limited by the heat transfer rate of the joint and structure in order to avoid degradation of the adjacent thermoset composite structures 19,19'. Upon termination of the electrical energy supply, the joint is allowed to cool by using the bonded structures 19, 19' as heat sinks. The entire fusion cycle should take approximately two to three minutes.

In certain instances the availability of local structure to act as a heat sink may vary along the length of the joint. In these instances heat balancing may be required in order to ensure uniform heating and cooling of the joint during the bonding process.

After the cooling period is completed, the structures are bonded as shown in FIG. 5. The various layers of thermoplastic adhesive 32 are fused together and the dry fiber reinforcement 16 is embedded and encapsulated by the thermoplastic adhesive 32 and the thermoset resin of the thermoset composite structures 19,19'. The dry fiber reinforcement 16 provides a mechanical lock, between the thermoplastic adhesive 32 and the thermoset composite structures 19,19' which provides the bond strength. The heating element 22 remains in place and the electrical leads 28 remain attached to the heating element to allow for later reheating of the joint to permit repair or replacement of the bonded structures 19,19'.

The replacement procedure for a bonded structure would comprise the following steps. First, the joint would be heated by supplying electrical energy to the heating element 22 sufficient to heat the joint above the melting temperature of the thermoplastic adhesive. The process would be maintained until the thermoplastic adhesive was melted, the joint could be separated, and the damaged structure could be removed. Second, the replacement structure, which would consist of a cured thermoset composite structure surfaced with thermoplastic adhesive in the joint zone (similar to the initial structure as shown in FIG. 4), is positioned in place of the removed structure. Third, a new heating element, which is positioned in the joint, is heated by supplying electrical energy as discussed previously for bonding structures. The entire replacement process, assuming a cured structure and new heating element are readily available, may be completed in a matter of minutes.

Although certain thermoplastic materials (PEEK and PEI) are suggested as particularly useful for the specific embodiment illustrated in FIGS. 1 to 5, the selection of these materials is not limiting and it should be understood that other thermoplastic materials may be equally applicable to the present invention. In addition, the present invention may, if desired, be practiced by using a single type of thermoplastic material as long as a layer of partially exposed dry fiber reinforcement (not embedded in the thermoplastic material) is maintained for embedding in the thermoset composite structure during the lay-up and curing process.

Although the invention has been shown and described with respect to exemplary embodiments thereof, it should be understood by those skilled in the art that various changes, omissions and additions may be made therein and thereto, without departing from the spirit and the scope of the invention.

We claim:

1. A heating element structurally configured for interposition and operation between two composite structures to be bonded together for heating a bonding joint therebetween, each composite structure having cured thereto a thermoplastic adhesive strip, each thermoplastic adhesive strip having a thermoplastic layer defining a bonding surface for the respective composite structure, the bonding surfaces defining the bonding joint between the two composite structures to be bonded together, said heating element comprising:
   an electrical resistance material;
   first and second layers of electrical insulation, said electrical resistance heating material being sandwiched between said first and second layers of electrical insulation;
   a pair of electrical leads connected to said electrical resistance heating material; and
   a layer of thermoplastic adhesive material encasing said first and second layers of electrical insulation, said thermoplastic adhesive material encasing said first and second layers of electrical insulation being compatible with and structurally configured for contact with the thermoplastic material layers of the thermoplastic adhesive strips that define the bonding surfaces between the two composite structures to be bonded together, said thermoplastic adhesive material being selected from thermoplastic adhesive materials suitable for bonding composite structures together;
   said heating element being interposable between the composite structures to be bonded together such that said layer of thermoplastic adhesive material contacts the thermoplastic layers of the composite structures to be bonded together;
   said interposable heating element being operable to melt and fuse said layer of thermoplastic adhesive of said interposable heating element to the thermoplastic layers of the composite structures to form the bonding point for the composite structures to be bonded together.

2. The heating element according to claim 1, wherein a thermocouple is embedded within said layer of thermoplastic adhesive material to monitor the temperature of said heating element when two composite structures are bonded together.

3. The heating element according to claim 1, wherein said electrical resistance heating material comprises a flat sheet of electrically conductive material.

4. The heating element according to claim 1, wherein said electrical resistance heating material comprises an etched foil of electrically conductive material.

5. The heating element according to claim 1, wherein said electrical resistance heating material comprises a pierced and stretched foil of electrically conductive material.

6. The heating element according to claim 1, wherein said electrical resistance heating material comprises a stamped element of electrically conductive material.

7. The heating element according to claim 1, wherein said electrical resistance heating material comprises a wound wire serpentine of electrically conductive material.

8. The heating element according to claim 1, wherein said pair of electrical leads are comprised of low resistance electrically conductive leads which extend across the width of the resistance heating material.

9. The heating element according to claim 1, further including a plurality of electrical leads which are spaced along the length of and electrically interconnected to said electrical resistance heating material, adjacent electrical leads defining segments of said heating element, and wherein said segments are configured to be heated individually.

10. The heating element according to claim 9, wherein said plurality of electrical leads are spaced sequentially along the length of said electrical resistance heating material.

11. The heating element according to claim 1, wherein said first and second layers of electrical insulation are operative to thermally insulate said electric resistance heating material to provide uniform heat distribution along the length and width of said heating element.

* * * * *